(12) United States Patent
Renkes et al.

(10) Patent No.: US 8,161,024 B2
(45) Date of Patent: Apr. 17, 2012

(54) SELECTION OF ROWS AND VALUES FROM INDEXES WITH UPDATES

(75) Inventors: Frank Renkes, Rauenberg (DE); Thomas Peh, Heidelberg (DE); Andrew Ross, Altrip (DE); Holger Schwedes, Stutensee (DE); Wolfgang Stephan, Heidelberg (DE)

(73) Assignee: SAP AG, Walldolf (DE)

( * ) Notice: Subject to any disclaimer, the term of this patent is extended or adjusted under 35 U.S.C. 154(b) by 0 days.

(21) Appl. No.: 12/901,268

(22) Filed: Oct. 8, 2010

(65) Prior Publication Data
US 2011/0055257 A1 Mar. 3, 2011

Related U.S. Application Data

(63) Continuation of application No. 11/867,573, filed on Oct. 4, 2007, now Pat. No. 7,836,037.

(51) Int. Cl.
*G06F 17/30* (2006.01)
(52) U.S. Cl. ........................................ 707/705
(58) Field of Classification Search .............. 707/3, 102; 711/170–171
See application file for complete search history.

(56) References Cited

U.S. PATENT DOCUMENTS

| | | | | |
|---|---|---|---|---|
| 5,539,899 A | * | 7/1996 | Huynh et al. | 711/171 |
| 5,838,950 A | * | 11/1998 | Young et al. | 703/21 |
| 5,953,723 A | * | 9/1999 | Linoff et al. | 1/1 |
| 6,439,783 B1 | * | 8/2002 | Antoshenkov | 1/1 |
| 2004/0243560 A1 | * | 12/2004 | Broder et al. | 707/3 |
| 2005/0192998 A1 | * | 9/2005 | Dittrich et al. | 707/102 |
| 2008/0294863 A1 | * | 11/2008 | Faerber et al. | 711/170 |

* cited by examiner

*Primary Examiner* — Sheree Brown
(74) *Attorney, Agent, or Firm* — Mintz, Levin, Cohn, Ferris, Glovsky & Popeo, P.C.

(57) ABSTRACT

Methods and apparatus, including computer program products, for selection of rows and values from indexes with updates. In general, rows of an index may be associated with validity flags that indicate whether a row has been updated with an update inserted in a delta index; one scheme for value identifiers may be used for an index and another scheme for one or more delta indexes where all of the indexes are, to at least some extent, compressed according to dictionary-based compression; and multiple delta indexes may be used in alternation such that one delta index may accept updates while another is being updated. The delta indexes may also have validity flags and all updates, such as modifications of values, deletion of records, and inserting of new records may be handled as updates accepted by one or more delta indexes.

16 Claims, 6 Drawing Sheets

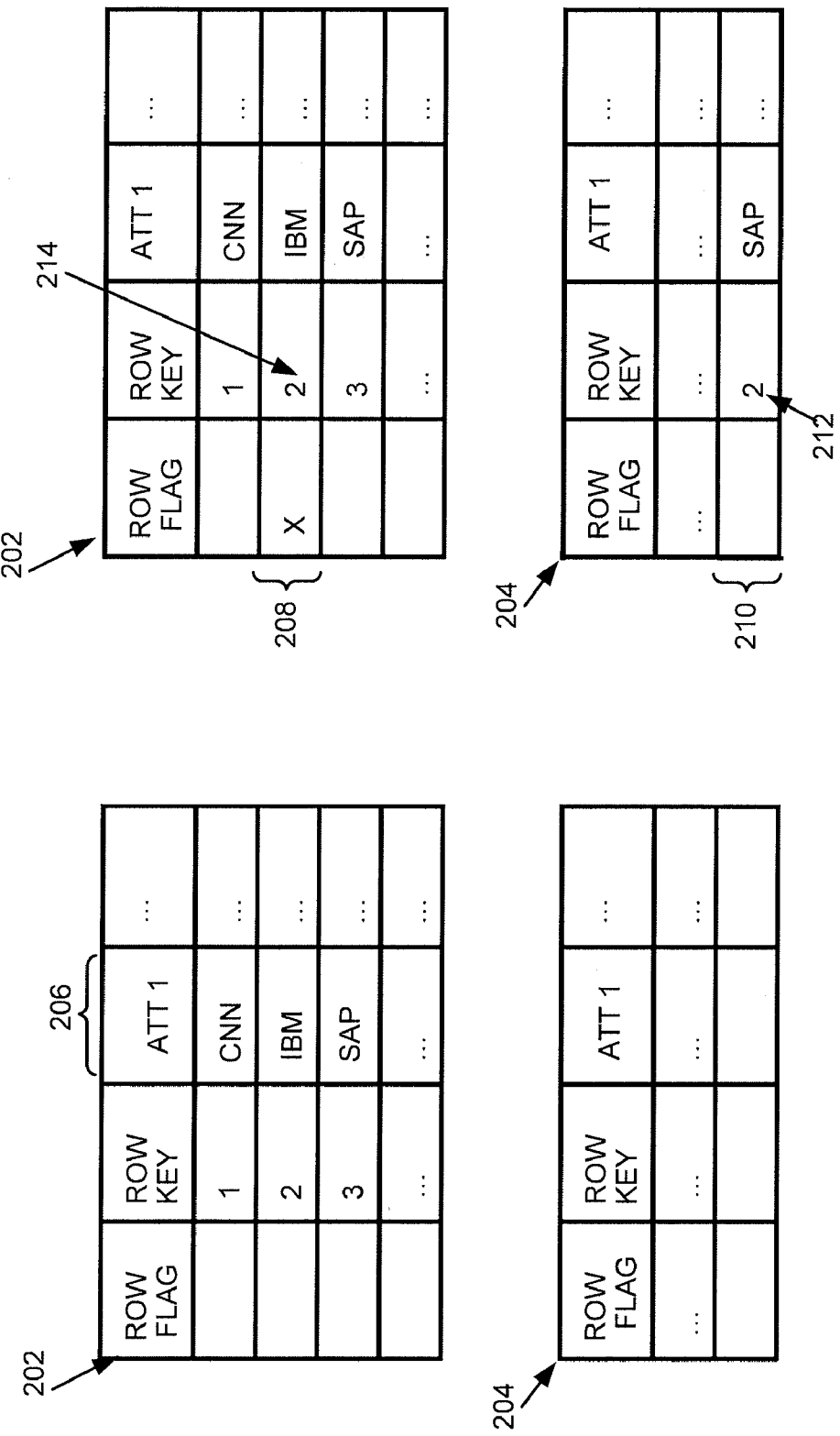

SELECTION OF ROWS AND VALUES FROM INDEXES WITH UPDATES

CROSS REFERENCE TO RELATED APPLICATIONS

This application is a continuation application of U.S. patent application Ser. No. 11/867,573, filed on Oct. 4, 2007, now U.S. Pat. No. 7,836,037 and entitled "Selection Of Rows And Values From Indexes With Updates" the contents of which are hereby incorporated by reference.

BACKGROUND

The present disclosure relates to data processing by means of a digital computer, and more particularly to selection of rows and values from indexes with updates.

Search engines may search large amounts of data in database tables, such as relational tables, to find results. The data in database tables or indexes may be structured business data, where the data is structured in the sense that data may be attributes or key figures which are organized in the table or index, and attributes or key figures may have dependencies. For example, in a table of information, a row may have dependencies among data in the row such that data in each of the columns of the row is associated with other data in other columns of the row.

Data may originate from database tables and be stored in memory as indexes where the data may be compressed using different techniques, one of which may be referred to as dictionary-based compression, which involves generating value identifiers that are stored in lieu of values (e.g., of attributes) in the indexes, and having one or more dictionaries that describe associations between value identifiers and values represented by the value identifiers.

Value identifiers may be numbers that replace attribute values within indexes. For example, attribute values may be long text strings but value identifiers that represent the attribute values may be defined to be as small as reasonably possible in order to minimize the memory resources they consume. For example, a number of bits used to represent value identifiers in a column of an index may be based on a cardinality of the values for an attribute in that column such that a minimum number of bits are used. Value identifiers may be assigned locally to a table such that value identifiers for one and the same value may be different in different tables.

Dictionaries may be ordered lists of row identifiers or value identifiers with corresponding row key values or attribute values beside the identifiers. A dictionary may be local to a table or local to one or more columns. For example, compression of data in accordance with dictionary-based compression may be on a column-by-column basis, where each column of data has one or more dictionaries which are separate from dictionaries of other columns, and columns of indexes store value identifiers that may be non-unique across columns. When a search engine reads a request, the search engine may use dictionaries to look up attribute values contained in the request. When the search engine returns a result set, the search engine may use dictionaries to look up row identifiers and value identifiers in a result set and translate the result set into values such that, for example, a user may understand the result set.

Updates to data may be stored in delta indexes which are indexes separate from a main index. Delta indexes may also be generated on a column-by-column basis and may be compressed using dictionary-based compression.

A record of an index may be updated by another record in a delta index, and both may be viewed as separate records in the sense of being separate database records although both database records may represent a same logical record, where, for example, one logical record is updated with an updated copy of the logical record.

For massive amounts of data, such as a combination of tables containing millions of records, processing of the data, including updating of thousands of records in brief time intervals, may require lots of hardware resources. For example, large amounts of processor resources may be required to re-sort a table to include updates.

SUMMARY

The subject matter disclosed herein provides methods and apparatus, including computer program products, that implement techniques related to selection of rows and values from indexes with updates.

In one, general aspect, a first index of records of a database table and a second index of changes to the first index are searched to find a first record and second record in the first and second indexes, respectively, matching a search request. The second record represents a change to the first record of the first index of the database table, and may be described as a delta record of a delta index. The searching includes determining to omit the first record from a result set based on a row of the first record being marked as invalid, determining to include the second record in the result set, and translating a first value identifier of the second record to a second value identifier based on a first association and a second association, for example, because the value identifiers in a delta index may be local to the delta index and require translation to a value identifier scheme used in a main index. The first and second associations are in a third record representing the first association of a value represented by the second record with the first value identifier, and the second association of the second value identifier with the data representing the change, where the third record may be a value identifier translation record in a translation table supplementary to a delta dictionary corresponding to the delta index. The first value identifier identifies the data representing the change in the second index, which may be called a delta index, and the second value identifier identifies the data representing the change in the first index of the database table, which may be called the corresponding main index. The result set including the second value identifier as part of a result matching the second record is returned.

In a related aspect, a first, a second and a third index of a database table are searched to find a first record and a second record as records matching a search request. The second record may be a delta record of a delta index, the second and third indexes may be delta indexes, and the third index may be a supplementary or temporary delta index for use during the time when the other delta index, that is the second index, is being merged with the main index, that is the first index. The second record represents a change to the first record of the first index, where the second index receives records representing changes when the first index is not being merged with the second index and the third index receives records representing changes when the first index is being merged with the second index. The searching includes determining to omit the first record from a result set based on a row of the first record being marked as invalid, finding the second record in one of the second or third indexes, and determining to include the second record in the result set. The result set is returned where the result set includes the second record.

In a related aspect, an index of a database table and two delta indexes are searched to find a record and a delta record as records matching a search request. The delta record characterizes a change to the record of the index of the database table, a first delta index of the two delta indexes is a delta index including delta records when the index is not being merged with the first delta index, and a second delta index of the two delta indexes is a delta index including delta records when the index is being merged with the first delta index. The searching includes finding the delta record in one of the two indexes, determining to include the delta record in the result set, and translating a first identifier of the delta record to a second identifier based on a first association and a second association. The first and second associations are in a delta dictionary record for the delta record, where the first association is an association of the first value identifier with data characterizing the change and the second association is an association of a second value identifier with the data characterizing the change. The first value identifier identifies the second data in the delta index and the second value identifier identifies the data characterizing the change in the index of the database table. The result set is returned including the first identifier as part of a result matching the delta record.

In related aspects techniques, mechanisms, or both of two or more of alternate delta indexes, validity row flags, and local and global identifiers may be combined.

The subject matter may be implemented as, for example, computer program products (e.g., as source code or compiled code tangibly embodied in computer-readable media), computer-implemented methods, and systems.

Variations may include one or more of the following features.

In an iteration, a search may involve finding N records (for some integer N greater than one) matching a search request and all denoting the same logical record, where N minus one of the records are marked as invalid and the Nth record is therefore selected for inclusion in a result set. For example, a record containing a new update to two records may be received, where the two records include a record that is a previous update to another record and the other record. A row of the record that contains the previous update may be marked as invalid, and a new row including the new update record may be inserted. The record for the new update may be selected for inclusion in a result set while the other two records are not.

A result set may be processed in accordance with a second value identifier used to identify a value in a first index and the value associated with the second value identifier may be displayed to a user.

An index may include data representing structured business data having data dependencies across a same row of a table. The business data may include business objects modeled as sets of joined tables. Computing a result set may involve creating one or more extended rows by joining multiple tables as specified in business object models for those tables, and translating value identifiers used in the respective tables by techniques similar to those described for delta indexes.

Operations of searching and the like may be performed in parallel on a plurality of hardware servers.

A record representing a change along with other changes in a second index that stores changes may be integrated asynchronously with a first index.

A record representing a change along with other changes in a second index that stores changes may be integrated with a first index based on the second index reaching a threshold memory footprint size, for example, of between ten and twenty percent of the memory footprint of the first index.

One index may receive updates to a main index during a merge operation of the main index with another index that accepts changes.

An index may include value identifiers representing values in a dictionary of the value identifiers associated with the values.

An index may be compressed in accordance with dictionary-based compression for one or more columns.

A first record may be marked as invalid by including a value in a field indicating whether the row is valid or invalid that identifies the row as invalid.

One value identifier may be used to represent values of records in one index based on an alphabetical assignment of value identifiers in that index and another value identifier may be used to represent values of records in another index based on a chronological assignment of value identifiers in the another index.

One index may be a flat file and another index that stores changes to that index may be a k-structured tree.

A request to change first data of a record in an index to second data may be received, a record representing that change may be stored in another index with a value identifier representing the change, and a record may include an association of the value identifier with the change. The value identifier may identify the change in the other index and another value identifier may identify the change in the index. An association between the value identifier and the other value identifier may be generated in a dictionary of the other index. A row of the record in the index may be marked as invalid.

Validity updates may be part of an index that does not receive updates to the values in its records. For example, an index, which may be referred to as a main index, may include a column in which validity updates to records may be received but updates to values of the records are not received, and other indexes may be delta indexes that receive updates to values of the records in the index which does not receive updates to values of its records.

Validity updates may be stored in a data structure separate from an index (e.g., in a data structure separate from a main index, delta index, or both). If the validity updates are separate from an index of records, so long as it contains the same number of rows as the index to which it corresponds and so long as the rows remain in the same order, a flag bit vector may be an appropriate data structure for storing validity flags. Such a bit vector may be written beside a corresponding index as if it were an additional column, and can then be seen to flag precisely the intended rows. Locating the validity flags in a separate data structure from an index including the records to which the validity flags correspond may advantageously avoid a performance penalty that may be associated with changing a main or delta index merely to record a validity update flag change.

A request to update a record representing a change with another change may be received. In response to the request, a record representing the another change may be inserted in a first delta index if there is no merge operation between one index and the first delta index; otherwise, the record may be insert in a second delta index. In either case, a row of the record representing the change may be marked as invalid.

A first index, second index, and third index may each have separate systems for assignment of value identifiers to values. For example, the first index may have value identifiers assigned alphabetically based on an alphabetical sorting of values, the second index may have value identifiers assigned chronologically based on chronological insertion of records with values in the second index, and the third index may have value identifiers assigned chronologically based on chronological insertion of records with values in the third index.

The subject matter described herein can be implemented to realize one or more of the following advantages.

Two delta indexes may be deployed in alternation in order to allow updates to be accepted during merges of delta and main indexes, and main indexes may be used with row flags to indicate invalidation of a row by an update to one or more delta indexes. Use of such row flags and one or more delta indexes may allow main indexes to be write-only structures and thus in turn facilitate optimization for availability and memory footprint. For example, a main index may be large and occupy a large chunk of memory space, so it may be advantageous to implement it in a maximally compact fashion that need not be updated with new rows and may be fast for searching. By contrast, since delta indexes may always be merged before they grow too large, they need not be implemented to be maximally compact and may instead be implemented for maximally fast writes. For example, a main index may be implemented as a flat table and delta indexes may be implemented as tree structures.

Value identifiers used for dictionary-based compression of a main index may differ from value identifiers used for one or more delta indexes, where the value identifiers for a main index may be referred to as a global value identifiers and the value identifiers of a delta index may be referred to as local value identifiers. Use of local value identifiers in addition to global value identifiers may enable delta index updates to be written directly to a delta index without lookup of value identifiers in a dictionary of a main index, which may be much larger than a dictionary of a delta index, and hence may facilitate fast updates. Mappings of local to global identifiers may be performed to preserve referential correctness and the mappings may be used to translate search results to one consistent scheme of value identifiers.

All updates may be updated as inserts to one or more delta indexes, which may have a side effect of having a combination of a main index and a delta index grow larger than necessary; however, for a delta index this growth may be harmless, since a delta index may be merged before it grows too large (e.g., when it reaches a threshold memory footprint; e.g., 10-20% of the size of a main index or of a combined size of the main and delta index). Rebuilding a main index may take a long time but that time may be uncritical, as it may be scheduled to run during a quiet period and an old version of a main index and a delta index may be available for serving search requests.

A natural way to allocate value identifiers to attribute values for a main index is to write the main index dictionary as an ordered list, for example an alphanumeric list, of all attribute values appearing in the index and then to number the values in the list and to use the numbers as value identifiers. An advantage of the alphanumeric or other ordering is that it may facilitate value lookup. To allow for updates to a dictionary of value identifiers for a main index, such a dictionary may accept new value identifiers that might be after an ordered set of value identifiers. As a main index may be rebuilt infrequently, it might not be a great disadvantage that the dictionary would need to be rewritten if the values were to be changed. A natural way to allocate value identifiers to attribute values for a delta index may be to list the attribute values in their order of appearance in the delta index, where each new attribute value that appears in an update is appended to the list so that the list reflects a chronological ordering. The delta index dictionary generated in this way may use the row numbers in this list as value identifiers. An advantage of the chronological ordering is that it remains unchanged as new updates are appended to the delta index and thus facilitates fast writes for updates. Since a delta index might not normally grow very large, it might not be a great disadvantage that a delta dictionary might not support optimally fast value lookup. And, it may allow value identifiers to be allocated on a local basis for delta indexes, so it may simplify and speed up a process of writing updates.

A combinations of two delta indexes, row flags, and two forms of value identifiers may be synergistic in scenarios where a main index is too big to re-write easily and hence delta merges take a long time; the main index is implemented too compactly to support easy deletion of invalidated rows; and main dictionaries of the main index are too big to allow direct use of global value identifiers during fast individual updates.

Joins may be allowed to be performed in connection with the combination with the above techniques, mechanisms, or both. These joins may be required to build up result sets containing long rows from multiple tables, where the tables are joined on matching columns that use different value dictionaries and may variously support or not support delta mechanisms. For example, some of the tables may contain slowly changing master data that do not require a delta update mechanism. In such cases, the use of local value identifiers for the various tables may be indispensable for practical reasons.

Details of one or more implementations are set forth in the accompanying drawings and in the description below. Further features, aspects, and advantages will become apparent from the description, the drawings, and the claims.

BRIEF DESCRIPTION OF THE DRAWINGS

FIGS. 2A-2C are a series of diagrams illustrating a process of updating a main index and a delta index.

Like reference numbers and designations in the various drawings indicate like elements.

DETAILED DESCRIPTION

Figure 1:
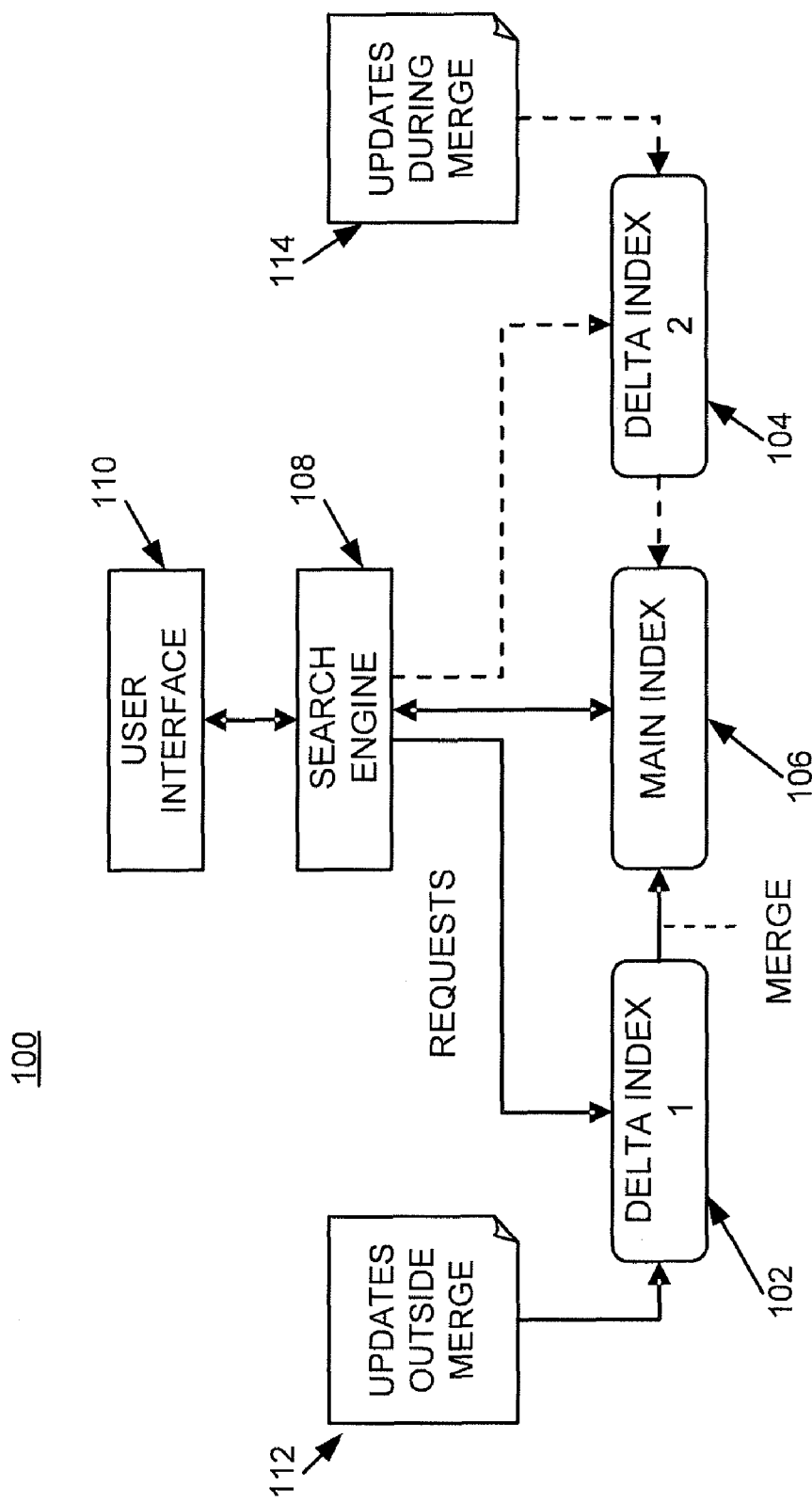
FIG. 1 is a block diagram of a system including multiple delta indexes.

FIG. 1 is a block diagram of a system 100 including multiple delta indexes 102, 104. In general, the multiple delta indexes 102, 104 may be used such that one delta index is available to accept updates while another is merged with a main index 106. This is illustrated in the system 100 where updates outside of merge 112 are accepted by the first delta index 102, while updates during merge 114 are accepted by the second delta index 104. Similar to the second delta index 104 accepting updates during a merge operation between the main index 106 and the first delta index 102, the first delta index 102 may accept updates during a merge operation of the main index 106 and the second delta index 104.

A search engine 108 may handle requests to search information stored in the main index 106 and the two delta indexes 102, 104. The search engine 108 may search each of the main index 106, the first delta index 102, and the second delta index 104 in parallel to find records that match search criteria. If results are in two or more of the indexes, results from multiple indexes may be merged. For example, if two records from the main index, three records from the first delta index 102, and one record from the second delta index 104 match search criteria of a search, the records from each of the indexes may be merged to provide a result set. The search engine 108 may be referred to as a search engine because the search engine 108 uses selection criteria entered by a user to read data (such as the main index 106, which may be held in memory) and to select and suitably process subsets of the data for inclusion in a result set to be returned to a user.

A user interface 110 may provide access to the search engine 108 for a user. For example, the user interface 110 may be a graphical user interface or a command-line user interface that may be used to enter search requests that may be relayed by the user interface 110 to the search engine 108, and the user interface 110 may display search results provided by the search engine 108. For example, a user may select a combination of pull-down menus and type text in text fields such that a query "ALL PRODUCT ORDERS IN ROWS 5 TO 10 HAVING ABC COMPANY AS A CUSTOMER," is generated by the user interface 110 and sent to the search engine 108. Then, if the main index 106 is an index of product orders, the search engine 108 may perform the search on each of the main index 106, the first delta index 102, and the second delta index 104 to find a set of results, which may be referred to as a result set, that matches the query. Searching the index may include finding rows that have row keys matching the interval between five and ten to generate a result set, then, the result set may be filtered for product orders having an attribute with the value matching "ABC COMPANY." The results in the result set may then be returned by the search engine 108 and displayed by the user interface 110. The user interface 110 may support searches that are logically equivalent to queries in a standard language such as SQL (Standard Query Language), which may be supported by the search engine 108.

In general, a result set from a search performed by the search engine 108 is a subset of rows or sub-rows selected from an index to satisfy a user request. For example, a table of product items may include rows for each product, one of the columns may be an attribute color that includes values that represent colors, such as red, blue, green, yellow, and the like, and other columns may include attributes for prices and sizes. Following that example, a user may request a list of red items with their prices and sizes. In response to the request the search engine 108 may read table row identifiers for rows including the attribute value red in an inverted index for the color attribute. Based on the row identifiers that are read, the search engine 108 may then read value identifiers for price and size for the rows matching the row identifiers from price and size column indexes. The search engine 108 may search for values matching the price and size value identifiers in respective dictionaries for the price and size columns, and the search engine 108 may generate a result set listing the key attributes for the selected items with the prices and sizes of those items.

The main index 106 is an index of a database table, which may be generated from structured data in relational tables. The main index 106 may be a column index, an inverted index, a non-inverted index, or combination of indexes. For example, the main index 106 may be a combination of column indexes for each key attribute. In general, a column index is created from a column in a relational table as a list of row values for a column attribute or key figure. For example, if a column specifies a color of an item in each row of the table, the column attribute may be color and the attribute values for rows may be red, white or blue.

In general, an inverted index is an ordered list of values for one or more attributes or key figures where beside each value there is an ordered series of row identifiers specifying rows for which a value is instantiated. For example, an inverted index for a color attribute may list red, white and blue, and for each color a series of numbers specifying the table rows that instantiate a particular color may exist.

By contrast to an inverted index, a non-inverted index is a list of row identifiers where beside each row identifier is an ordered series of attribute or key figure values instantiated in that row. For a single attribute, a column index may be considered a non-inverted index.

In any of the types of indexes, row identifiers may be numbers that may be used to identify rows and may be used as an alternative to, or in addition to, attribute keys. The attribute keys may be long text strings, for example, but the row identifiers are normally defined to be as small as reasonably possible in order to minimize memory resources they consume. Row identifiers may be assigned once for an entire table and reused in each column index for that table.

Records in the main index 106 may be ordered, for example, as a result of alphabetical ordering of attribute values which may reduce time required to look up a record and may result in an ordered numbering of rows by row identifiers. As the main index 106 may be large, for example with many millions of rows, updating of the main index 106 by adding new rows or changes to rows directly to the main index 106 may be slow. For example, if a main index has a million rows and a new row is inserted in the middle due to an alphabetical ordering, half a million row identifiers may need to be renumbered. Similarly, if a new row contains a new attribute value and if attribute value identifiers are assigned to values on the basis of a specific ordering, for example an alphabetic ordering, a large number of value identifiers may need to be changed. Also, a corresponding inverted index may need to be rewritten to insert the new value in an appropriate place. Similarly, if a row is deleted, a renumbering of row identifiers may be required.

Records may be stored in an index, such as the main index 106, because the indexes may have a logical structure that is optimized for efficient execution of tasks that the search engine 108 performs prior to retrieving relevant data for result sets. Performance may be greatly improved when indexes, such as the main index 106 and the delta indexes 102, 104, are held in memory and the search engine 108 performs its operations on them in memory, where performance improvement may be measured primarily by reduction of time required to return result sets to users.

Instead of having individual updates synchronized with the main index 106, updates may be accepted by one of the delta indexes 102, 104 as described above. In particular, the delta index indexes 102, 104 may alternate in accepting updates such that one of the delta indexes 102, 104 is available to accept updates if another is being merged with the main index 106. The main index 106 may be referred to as a main index as it may contain records that may be updated by records in either of the delta indexes 102, 104. Buffering updates in one of the delta indexes 102, 104 may enable the main index 106 to be left unchanged for longer periods of time, and may improve availability by potentially reducing downtime for main index rebuilds and by potentially enabling administrators to shift such downtime to periods of low system load. Delta indexes may be optimized for fast writes and main indexes may be optimized to minimize their memory footprint.

The delta indexes 102, 104 may be implemented in a type of data structure that differs from a data structure used to implement the main index 106, which may be chosen based on the delta indexes 102, 104 being structures that accept updates in contrast to the main index 106 which may be a structure that is rewritten during a merge operation and is optimized solely for reading with an exception of updating row flags. For example, the main index 106 may be implemented as vectors representing columns of key attributes and key figures, while the delta indexes 102, 104 may be implemented as n-ary trees, where the fan-out n of the tree specifies how many nodes immediately follow any non-leaf node in the tree. For example, in a binary tree the fan-out is two, which means that each non-leaf node is followed by two next nodes. In a binary tree, the nodes can be labeled with single bits such that a path through the tree is represented as a bit vector, where each bit specifies which branch to take at each successive step along the path to a leaf node. If a tree has depth eight, so that eight steps are required to get from the root node to a leaf, then each leaf node has a unique 8-bit (1 byte) address, and the tree as a whole has a total of 256 ($2^8$) potential leaf nodes.

Although one of the delta indexes 102, 104 may be available for accepting updates during a merge operation, the main index 106 may be invalidated and unavailable to accept search requests during a merge operation. For example, during rewriting of the main index 106 re-ordering of records may be performed in the main index 106 such that unavailability may be preserved to avoid inconsistencies among results. Due to an unavailability penalty that may be imposed by the main index 106 requiring re-ordering, renumbering, or both, when merging with either of the delta indexes 102, 104, application of the system 100 may be limited to scenarios not requiring frequent updates to the main index 106. In some implementations, a copy of an old index and an old delta index that are part of a merge operation may be available for searching during a merge operation. During a merge operation, the search engine 108 may send any user requests in parallel to the main index 106 and to both delta indexes and then combine the results from all three indexes. When a merge is completed, the first delta index 102 may be deleted and the second delta index 104 may become a sole delta index until such time as a new merge of the main index and the second delta index 104 is triggered. Thus, the second delta index 104 may replace the first delta index 102 as generally accepting updates and, in some implementations, there may only be two delta indexes during a merge.

Triggering of merging of either or both of the delta indexes 102, 104 may be based on one or more criteria. For example, merging may be automatically triggered if one of the delta indexes 102, 104 reaches a threshold size, which may be in the range of ten to twenty percent of memory size of the main index 106 (e.g., an event of reaching a threshold size may be registered by a memory tool that may send a feed to a monitoring utility, that might paint a screen alert or send an alert electronic mail message). As another example, merging may be performed on a schedule, such as every night when few, if any, search requests may be expected.

A merge operation, as described above, may involve re-numbering rows of the main index 106. In some implementations, a merge operation might not involve re-numbering of the main index 106, and a re-numbering may be reserved for an occasional re-writing of an index. For example, merge operations may be performed as inserts, invalidations, or both. For example, during a merge operation of the main index 106 with the delta index 102, changes to attribute values may be implemented as inserts of updated rows and rows corresponding to old versions of a record may be marked as invalid. Similarly, a deletion of a row may be implemented by invalidating the row to be deleted (and no row may be inserted to represent the deletion). In either case, non-updated rows need not be removed and invalidation of rows may be faster than deleting rows and renumbering rows, which may be required.

As another example, a delta merge may include writing new rows at appropriate places in the main index 106 and deleting any invalidated, old rows of the main index 106. Row identifiers of invalidated and deleted rows might not be immediately reused, since this may involve cumbersome renumbering of all the rows in the index, and greatly increase time required to perform a delta merge. As invalidated rows may be deleted, but the empty space may remain allocated in memory, a memory footprint of the main index 106 may grow as more and more delta merges are performed. To minimize the size of the main index 106, a solution may be to rebuild the main index 106 from scratch. In some implementations, row identifiers may be reused for new rows, which may refill gaps and obviate a need for an index rebuild.

The system 100 may be part of a large information technology landscape where multiple users generate large numbers of requests for structured data extracted from relational tables containing application data that is updated frequently and where the users expect that the result sets they obtain for their requests will reflect the latest updates to the data. Such an information processing infrastructure may include a storage system or database containing structured data in relational tables that is stored persistently and may be retrieved on demand, where the main index 106 is a table derived from the relational tables. The infrastructure may include sufficient random access memory (RAM) to store temporary copies of any desired persistent data retrieved from storage in order to enable fast processing of that data, for example to generate result sets in response to user requests.

Although the system 100 of FIG. 1 includes a certain number and type of components, implementations may vary. For example, although the system 100 includes a single main index 106 for the search engine 108, there may be multiple main indexes, each with one or two associated delta indexes. As another example, although the system 100 includes two delta indexes 102, 104 such that one delta index may be available while another is being merged with the main index 106, in some implementations only a single delta index may be used and, for example, updates may be buffered and unavailable for searching during a merge. As another example, the main index 106 and the delta indexes 102, 104 may support invalidation of rows, two sets of identifiers, or both, as will be discussed with reference to FIGS. 2A-4.

Figure 2C:
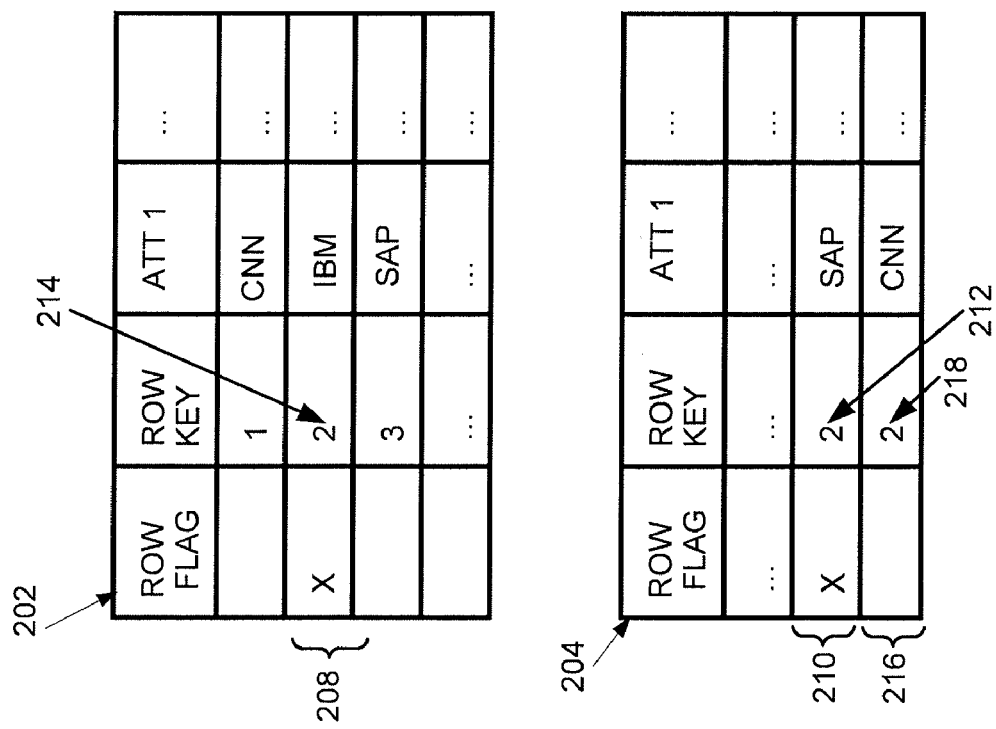

FIGS. 2A-2C are a series of diagrams illustrating a process of updating a main index 202 and a delta index 204. The data in the main index 202 and the delta index 204 is structured data that is not compressed and is ordered alphabetically by a first attribute of the first attribute column 206. Each of the rows in the main index 202 and the delta index 204 represents a record and each row is associated with a validation flag. A validation flag indicates whether a record associated with a row is valid in either of the main index 202 or the delta index 204. The main index 202 and the delta index 204 may be part of a system similar to the system 100 of FIG. 1. For example, the main index 202 may be the main index 106 of FIG. 1 and the delta index 204 may be either of the delta indexes 102, 104 of FIG. 1.

In general, the series of diagrams of FIGS. 2A-2C include the main index 202 with the delta index 204 that includes no updates to the first three rows in a first diagram of FIG. 2A.

The information represented by the main index 202 and the delta index 204 is updated with a first change that is included in a second diagram of FIG. 2B by invalidating a row of the main index 202 and adding a delta record to the delta index 204. The row of the main index 202 is invalidated by setting or writing an invalidation flag for that row. Then, information represented by the main index 202 and the delta index 204 are updated with a second change in the third diagram of FIG. 2C by invalidating a delta record and adding a new delta record. Similar to invalidating a row of the main index 202, a row of the delta index is invalidated by setting or writing an invalidation flag for the row of the delta record that is invalidated.

Although in the diagrams of FIGS. 2A-2C invalidation of a row is indicated by a row flag 'X', invalidation may be represented using different techniques, mechanisms, or both. For example, a row flag may be represented by a binary bit being zero to indicate that a row is valid or one to indicate that a row is invalid.

Invalidation of rows may be implemented such that additions or modifications to records are performed by inserting rows and invalidating non-updated rows, and deletions of records are performed by invalidating an associated row. Inserting of rows may be limited to inserting updates in the delta index 204 (e.g., when an insertion is not part of a merge operation). Invalidation may be performed in both the main index 202 and the delta index 204. Thus, a delta index may include not only updates of main index records, but also updates of updates and so on recursively. For example, in the second diagram of FIG. 2B an update to a record represented by the second row 208 of the main index 202 is represented by inserting an updated row 210 to the delta index 204 and inserting an 'X' row flag indicating the second row 208 of the main index 202 is invalid. As another example, in the third diagram FIG. 2C an update to a record represented by the second row 208 of the main index 202 and a record represented by the first updated row 210 of the delta index 204 may be represented by inserting a second updated row 216 to the delta index 204 and inserting an 'X' row flag indicating the first updated row 210 of the delta index 204 is invalid.

As updates may affect several rows across a main index and one or more delta indexes, a search may involve finding N records (for some integer N greater than one) matching a search request and all denoting the same logical record, where N minus 1 of the records are marked as invalid and the Nth record is therefore selected for inclusion in a result set.

To ensure that a record of the delta index 204 that represents an update to a record in either of the main index 202 or the delta index 204 identifies a record that is updated, an identifier, such as a row key, may be used. For example, in the second diagram of FIG. 2B the update to the record represented by the second row 208 of the main index 202 is represented by the updated row 210 of the delta index 204, where the updated row 210 includes a row key 212 of value '2' referring to the second row 208 of the main index 202 having a same value '2' for a row key 214 of the second row 208. As another example, in the third diagram of FIG. 2C, the update to the record represented by the second row 208 of the main index 202 and the delta record represented by the first updated row 210 of the delta index 204 is represented by the second updated row 216, which includes a row key 218 of having a same value '2' of the row keys 212, 214 of the second row 208 of the main index 202 and the first updated row 210 of the delta index 204.

In general, the row key may be a unique identifier of a record in a main index, but need not uniquely identify a row. For example, multiple rows of the main index 202 may have a same row key to identify that they relate to a same underlying record being a set of information, where one of the rows may represent an update to the record represented by another row having the same row key, in which case the other row should be invalidated to preserve consistency. In general, only one valid row may exist for each row key in a main index. In addition to the row key being used as an identification of a record updated by another record, the row key may be used, as examples, during a merge operation or when performing searches to identify a row. For example, during a merge operation a row key may be used to synchronize records in the main index 202 and delta index 204 that represent same information such that an update may be applied to an appropriate record of the main index 202.

One or more updates may be inserted in the delta index 204 before the one or more updates are committed. By separating insertion of updates with committing of updates, rows that after a commit would be invalidated by updates need not be flagged as invalid, with a consequence that inserted updates may be ignored until they are committed (e.g., by setting a flag indicating an update inserted into the delta index 204 has been committed), where a commit may be a final step in a successful completion of a previously started database change as part of handling a transaction. Advantageously, updates may become effective when they are committed, and a delay that may otherwise have been caused by writing the updates only after they are committed may be avoided. Thus, a latency period between committing an update and making the update visible for responses to user requests may be held to a minimum. Also, rollbacks may be allowed to be performed.

For example, a bit vector may be used to represent validity flags associated with rows. At the start of a transaction, a current bit vector may be used as a mask to identify which rows of an index to read. Each running transaction may keep a local list of its changes to that bit vector, which may only be written to the index when the transaction commits. Hence writing of the rows themselves, which is slow and done as soon as possible, may be decoupled from the writing of the new bit vector, which is a much faster operation that occurs simultaneously with the commit. When a transaction T commits, the bit vector updates from other transactions that were running concurrently with T are used to correct the effect of transaction T. For example, if another transaction deleted a row while transaction T was running and T included that row in its result set, then the correction to T when it commits includes deletion of that row from the result set.

Although FIGS. 2A-2C are discussed with reference to particular techniques and mechanisms, implementations may vary. For example, multiple delta indexes may be used in combination with invalidation of rows of a main index, delta indexes, or both. For example, the main index 106 and the delta indexes 102, 104 of FIG. 1 may support invalidation of rows associated with records that are updated.

Figure 3:
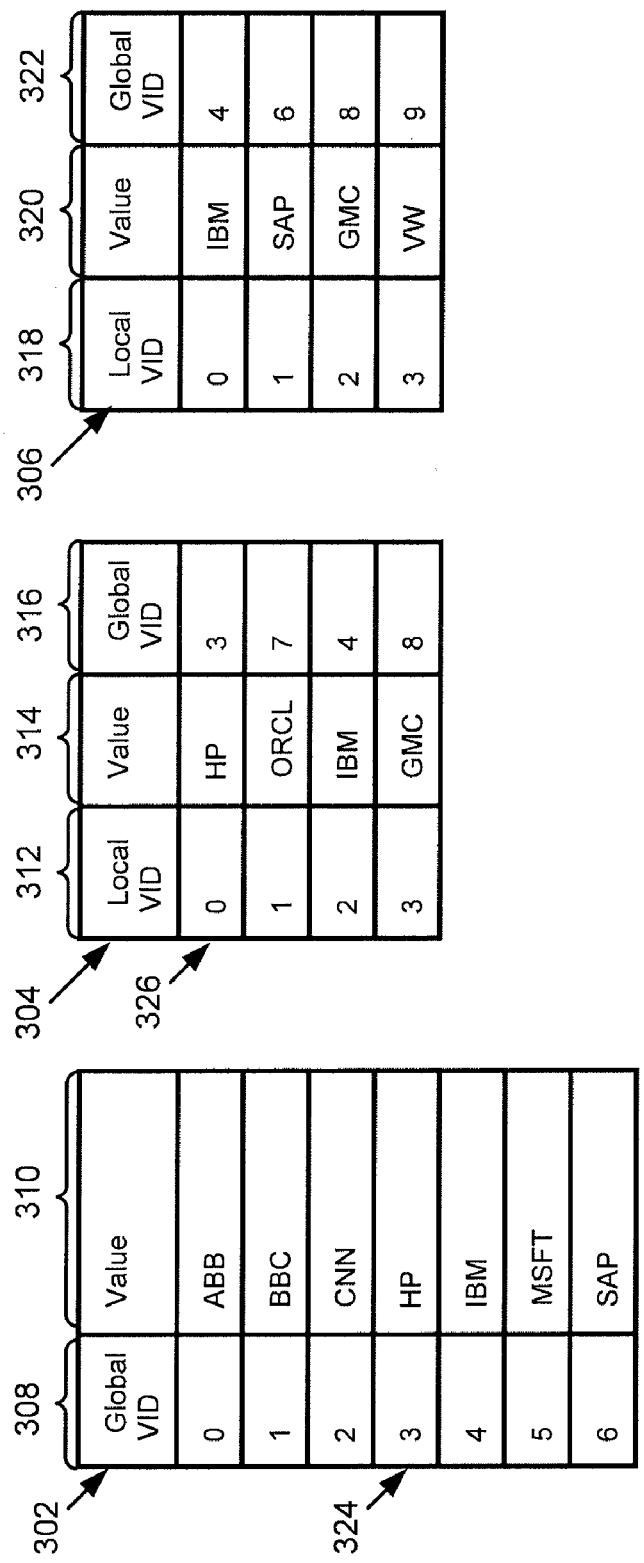
FIG. 3 is a diagram illustrating a dictionary of a main index and delta dictionaries of multiple delta indexes that include multiple value identifiers.

FIG. 3 is a diagram illustrating a main dictionary 302 of a main index and delta dictionaries 304, 306 of multiple delta indexes that include multiple value identifiers. The dictionaries 302, 304, 306 may be dictionaries of indexes from FIG. 1. For example, the main dictionary 302 may be a dictionary for the main index 106, a first delta dictionary 304 may be a dictionary for the first delta index 102, and the second delta dictionary 306 may be a dictionary for the second delta index 104 of FIG. 1.

The dictionaries 302, 304, 306 are dictionaries in the sense of being indexes from which to look up associations between values and value identifiers for dictionary-based compression. For example, the dictionary 302 may be a dictionary for a main index, which may be referred to as a main dictionary.

The dictionary 302 includes an association of value identifiers and values. In the dictionary 302, an association is provided by having a same row for associated value identifiers and values in the column of value identifiers 308 and the column of values 310, respectively. In general, value identifiers are used to represent values in a column of data. For example, for each column in an index there may be a dictionary similar to the dictionary 302, values in the column may be coded as value identifiers rather than values to conserve space, and the dictionary may be used to determine values represented by a value identifier. Thus, the dictionary 302 may serve as a reference for translation of value identifiers of an index.

Similar to the dictionary 302 being a reference for translation of value identifiers in an index, the delta dictionaries 304, 306 may also be references for translations of value identifiers for delta indexes. Each of the delta dictionaries 304, 306 include an association of value identifiers of a column of a delta index with values, as represented by value identifiers in the columns of value identifiers 312, 318 being in a same row as associated values 314, 320.

Value identifiers in each of the dictionaries 302, 304, 306 may each be assigned in accordance with a different assignment scheme. For example, value identifiers in the dictionary 302 may be assigned based on a sorted ordering of records in the dictionary 302, where the sorting may be alphabetical or otherwise. For example, the values in the column of values 310 of the dictionary 302 are sorted alphabetically and value identifiers in the column of value identifiers 308 are assigned in order based on that sorting. A sorting of records in a dictionary may be performed as an effort to improve performance of lookups in the records (e.g., having fast lookups), which may be complementarily improved by having value identifiers assigned according to the sorting of the records.

As another example, value identifiers in the first delta dictionary 304 may be assigned to a value based on a chronological ordering of records in a corresponding delta index. For example, as updates are accepted as new records in the first delta index 102, a new value may be assigned to a new value identifier (as values that are already associated with value identifiers need not be assigned a new value identifier).

Similarly, as another example, value identifiers in the second delta dictionary 306 may be assigned to a value based on a chronological ordering of records in a corresponding delta index. For example, as updates are accepted as new records in the second delta index 104, a new value may be assigned to a new value identifier (as values that are already associated with value identifiers need not be assigned a new value identifier).

The value identifiers in the dictionary 302 may be referred to as global value identifiers, as the value identifiers in the dictionary 302 may have a global scope; whereas, value identifiers in each of the delta dictionaries 304, 306 may be referred to as local value identifiers. The different sets of value identifiers may reflect the different schemes from which value identifiers are assigned to values. For example, as described above, the value identifiers of the dictionary 302 may be assigned according to an alphabetical ordering of records according to values associated with the value identifiers; whereas, the value identifiers of the delta dictionaries 304, 306 may be assigned according to chronological insertion of new records into delta indexes. Following that example, value identifiers in each of the dictionaries 302, 304, 306 may be associated with different values. For example, the value HP is associated with a global value identifier of '3' in a fourth record 324 of the main dictionary 302, the value HP is associated with a local value identifier of '0' in a first record 326 of the first delta dictionary 304, and the value HP is not associated with a value identifier in the second delta dictionary 306.

The difference in scope between global and local value identifiers may refer to use of value identifiers when results are merged, where global value identifiers may be used outside of a scope of a delta index to refer to a value. For example, when merging records, value identifiers of search results may be conformed to global value identifiers based on associations of global value identifiers with local value identifiers. For example, if records in the main index 106 and the first delta index 102 of FIG. 1 match a query, where the values are represented by value identifiers, value identifiers from records of the first delta index 102 may be translated to global value identifiers based on associations of local value identifiers with global value identifiers.

Associations of local value identifiers with global value identifiers may be stored in the delta dictionaries 304, 306. For example, each of the delta dictionaries 304, 306 includes a column of global value identifiers 316, 322, which may be used to determine a global value identifier associated with a local value identifier of a delta index. For example, if a record of a delta index corresponding to the first delta dictionary 304 matches a query and the record has a value identifier '0' associated with the value HP, when that record is returned as a search result (e.g., when returned for further processing of search results before being returned to a user, such as aggregation of key figures corresponding to the value), the value identifier may be of the record may be translated to the global value identifier '3'.

Associations of local and global value identifiers may be generated in response to various triggers. For example, the columns of global value identifiers 316, 322 in the first and second delta dictionaries 304, 306 may be populated in response to a search request having matching records in a delta index, where a lookup may be performed in the dictionary 302 to determine if there is a matching global value identifier. If a value in one of the delta dictionaries 304, 306 does not have an associated global identifier in the dictionary 302, a new global identifier may be assigned to the value. As another example, the columns of global value identifiers 316, 322 may be populated as records are added to delta indexes corresponding to the delta dictionaries 304, 306. As another example, the columns of global value identifiers 316, 322 may be populated asynchronously, in a background process.

Although FIG. 3 discloses a certain combination of components and features, implementations may vary. For example, although the column of values 310 in the dictionary 302 is entirely in alphabetical order, some of the values might not be in alphabetical order. For example, sorting the column of values 310 may be sorted alphabetically in a first instance. As merges are performed, new dictionary keys and corresponding global value identifiers may be added to the end of an alphabetically-sorted list of dictionary keys, such that all of the dictionary keys might not be alphabetically ordered.

Figure 4:
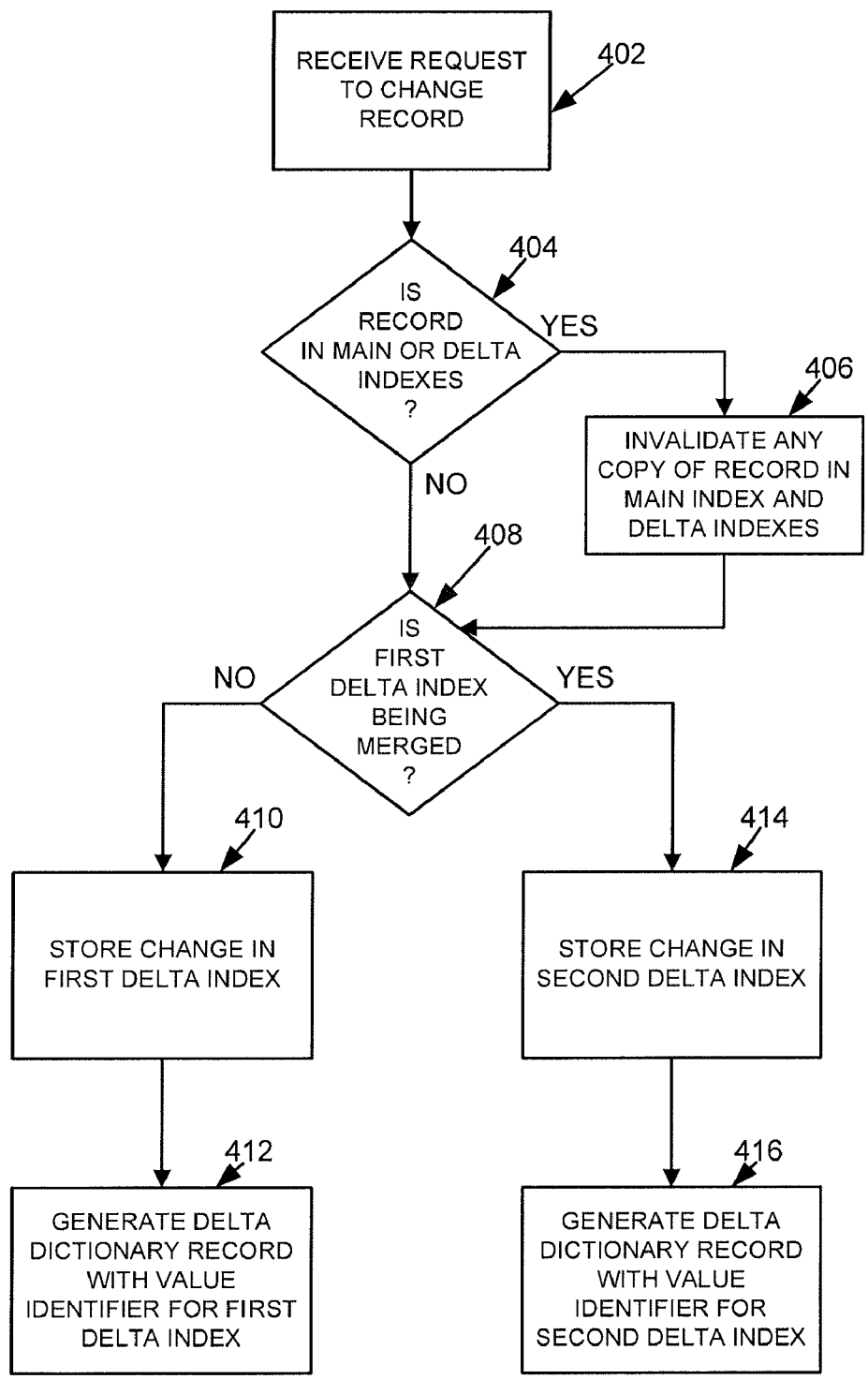
FIG. 4 is a flowchart illustrating a process of updating data where multiple delta indexes and row invalidation are deployed.

FIG. 4 is a flowchart illustrating a process 400 of updating data where multiple delta indexes and row invalidation are deployed. The process 400 may be implemented in the system 100 of FIG. 1, may use indexes similar to those of FIGS. 2A-2C, and may use dictionaries similar to those of FIG. 3. For example, the process 400 may be performed by a search engine, such as the search engine 106 of FIG. 1; by another program that manages a main index and delta indexes; or a combination of programs.

In general, the process 400 involves receiving a request to change a record (402), invalidating a copy of the record if one exists in either or both of main or delta indexes (404, 406), and storing a change and generating a delta dictionary record in either a first or second delta index depending on whether the first delta index is being merged with a main index (408, 410, 412, 414, 416).

A request to change a record is received (402). The record may have copies in the main index, or one of two delta indexes, which may be referred to as a first and second delta index. The request to make a change, as examples, may be a request to change a value from one value to another value, a request to delete a record, or a request to add a record. An index may be referred to as a main index where the index contains copies of records which may be updated by delta indexes.

A determination as to whether copies of the record are in a main index or either of two delta indexes (404) is performed. For example, the search engine 108 may perform a lookup in each of the main index 106 and the delta indexes 102, 104 for records matching the record to be changed. For example, a lookup may be performed based on a primary key of the record or a row identifier for the record from a table from which the main index 106 is based. If copies of the record are found, any copies are marked as invalid (406), which may involve, as an example, setting a row flag to indicate that a row of an index is invalid.

A determination is made as to whether a first delta index is being merged with a main index (408). The first delta index may be a delta index that accepts changes to records so long as the first delta index is not part of a merge operation with a main index. Thus, if the first delta index is not being merged, a change may be stored in the first delta index (410) and a delta dictionary record may be generated with a value identifier for the first delta index (412); otherwise, the change may be stored in the second delta index (414) and a delta dictionary record may be generated with a value identifier for the second delta index (414).

Storing a change in one of the delta indexes may include generating a record for the change with a value identifier representing a value to apply to an attribute (e.g., for each column of the record being compressed in accordance with dictionary-based compression). A record in a delta index may be referred to as a delta record and a record of a dictionary of delta index may be referred to as a delta dictionary record. Generating a delta dictionary record may include assigning a value identifier to a value of an attribute and populating a delta dictionary with the value identifier and the value.

Although the process 400 of FIG. 4 includes a certain number and type of sub-processes, implementations may vary. For example, in some implementations, a delta dictionary record may be generated only for a value that does not already have an associated value identifier.

Figure 5:
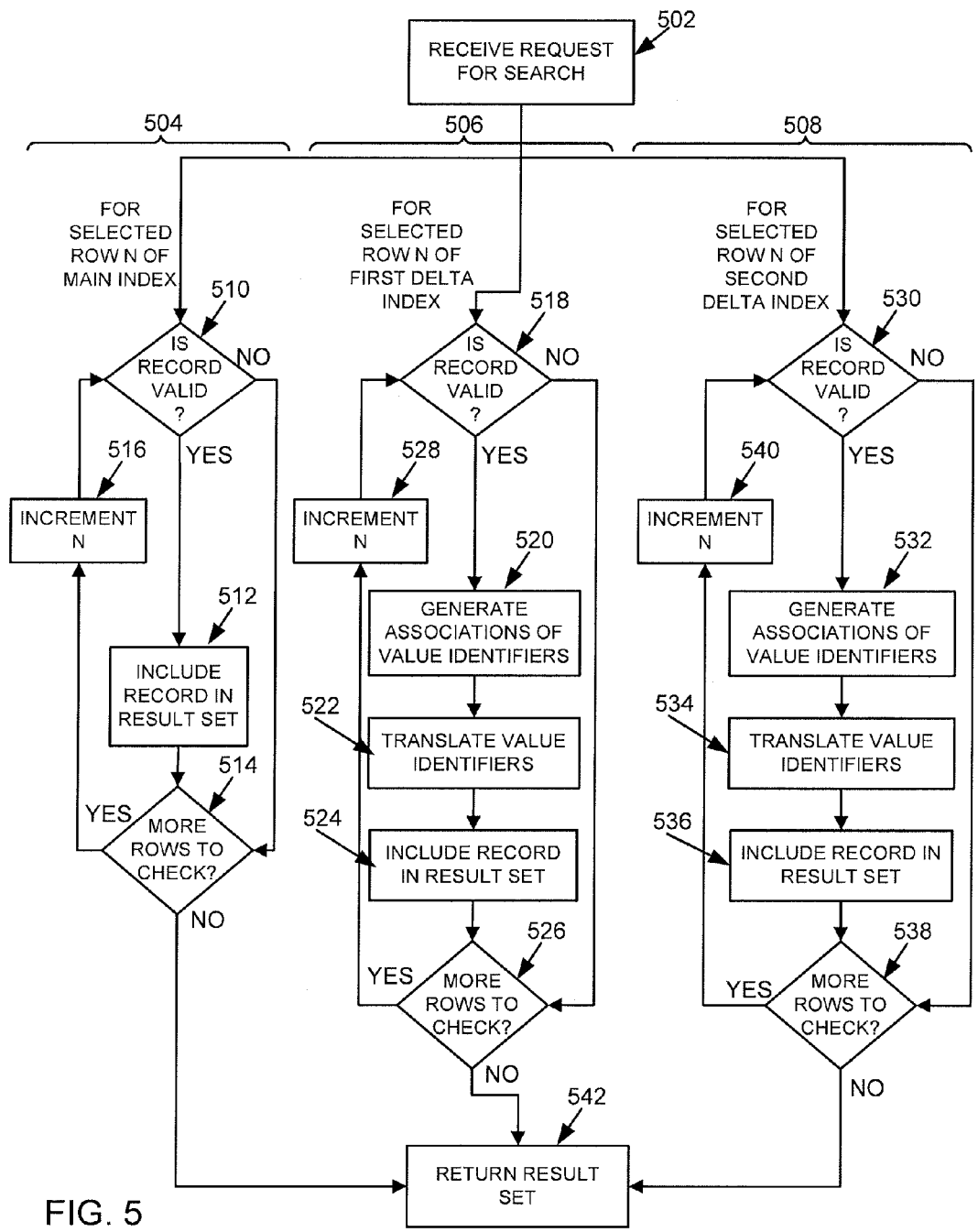
FIG. 5 is a flowchart illustrating a process of responding to a search where multiple delta indexes and row invalidation are deployed.

FIG. 5 is a flowchart illustrating a process 500 of responding to a search where multiple delta indexes and row invalidation are deployed. The process 500 may be implemented in the system 100 of FIG. 1, may use indexes similar to those of FIGS. 2A-2C, and may use dictionaries similar to those of FIG. 3.

In general, the process 500 involves receiving a request for a search (502); including selected rows that are valid from each of a main index, first delta index, and a second delta index in a set of results (504, 506, 508); and returning a result set (542).

A search request may be received (502), for example, by a search engine such as the search engine 108 of FIG. 1. A search request may include a query, which may be formatted in accordance with a query language such as SQL.

The search request may be used to determine selected rows of each of a main index, first delta index, and second delta index. For example, a search request may include criteria that include a selection of a certain combination of attributes which may be used to select rows. For example, a request may be "Give me date and sales point for all sales over $1 million in California this year." Indexes may relate the attributes to row keys in various indexes, and the results may then be joined by means of mappings between those row keys to generate sufficiently detailed rows for the result sets.

For each of the indexes, selected rows may be searched, in parallel, to find valid rows (504, 506, 508). For example, a search engine may use multi-threading to have each of the indexes searched in parallel. Finding valid rows may simply include going down a validity bit vector of validity flags for all selected rows.

For the main index, finding valid rows includes determining whether a record of an Nth selected row is valid (510), starting from a first selected row to a last selected row, where N is a positive integer. The variable N may represent a first to a last selected row in a subset of rows that are selected from the main index and does not necessarily reflect an ordering of rows in a main index, as rows that match a search request might not be consecutively located in the main index. Determining whether a record is valid may include checking a validity flag associated with a row. For example, a main index may have an extra column for validity flags which may be set or not set, where the setting of a validity flag may indicate a row is marked as invalid.

If a record is valid, the record is included in a result set (512) and a determination is made as to whether there are more rows to check (514). For example, a valid row may be appended to a result set for the main index. If a record is not valid, the record is not included in the result set and a determination is made as to whether there are more rows to check (514). In this fashion, invalid rows may be omitted from a result set. If there are more rows to check, N is incremented (516), and the process of checking for valid rows continues (510).

For the first delta index, finding valid rows includes determining whether a record of an Nth selected row is valid (518), starting from a first selected row to a last selected row, where N is a positive integer. The variable N may represent a first to a last selected row in a subset of rows that are selected from the first delta index and does not necessarily reflect an ordering of rows in a first delta index, as rows that match a search request might not be consecutively located in the first delta index. Also, the variable N used for the process of checking selected rows in the main index, first delta index, and second delta index are not the same variable N, as the subsets of selected rows differ. Determining whether a record is valid may include checking a validity flag associated with a row. For example, the first delta index may have a column of validity flags where validity flags for a row may be set or not set, where setting of flag may indicate a row is marked as invalid.

If a record is valid, an association of a value identifier of the record and a value identifier for the value in a main index is generated (520), the value identifier of the record is translated into a corresponding value identifier of the main index (522), the record is included in a result set (524), and a determination is made as to whether there are more rows to check (526). Generating an association of a value identifier of the record and a value identifier of the value in the main index may include performing a lookup in a dictionary of a main index for a value identifier of a same value. The value identifier of the record in the first delta index may be referred to as a local value identifier and the value identifier of the dictionary of the main index may be referred to as a global value identifier, as described with reference to FIG. 3. For example, a lookup up the value 'HP' may be performed in the dictionary 302 of a main index and the value may be inserted into the first delta dictionary 304 in a column of global value identifiers. Following that example, a record of a first delta index including the local value identifier '0' for HP may have the value identifier translated to '3', and the record with the translated value identifier may be included in a result set for the first delta index. If a value identifier of a dictionary of a main index does not exist that corresponds to the value of the value identifier in the record, a new value identifier may be generated. For example, if value identifiers are consecutive numbers, a number one greater than a highest value identifier of the dictionary of the main index may be assigned to the value and added to both the dictionary of the main index and the dictionary of the first delta index.

If a record is not valid, the record is not included in the result set and a determination is made as to whether there are more rows to check (526). In this fashion, invalid rows may be omitted from a result set. If there are more rows to check, N is incremented (528), and the process of checking for valid rows continues (518).

The process of finding valid, selected rows of a second delta index (508) is similar to the process of finding valid, selected rows of a first delta index (506). For example, for the second delta index, finding valid rows includes determining whether a record of an Nth selected row is valid (530), starting from a first selected row to a last selected row, where N is a positive integer. If a record is valid, an association of a value identifier of the record and a value identifier for the value in a main index is generated (532), the value identifier of the record is translated into a corresponding value identifier of the main index (534), the record is included in a result set (536), and a determination is made as to whether there are more rows to check (538). A second delta index might not be populated and the second delta index may be searched only during a merge operation between the main index and the first delta index, when the second delta index may receive updates.

Result sets from each of the main index, a first delta index, and a second delta index may be merged into a result set that is returned (542). As all of the value identifiers of records may be translated to a value identifier scheme of a main index, working on the value identifiers may be simplified and performing operations on the results (e.g., when merging the result set) may have improved performance (e.g., as value identifiers need not be translated). Value identifiers may be translated to a scheme of a main index, as opposed to a scheme of one or more delta indexes as a main index may be expected to return more results to any search such that less translation of value identifiers may be expected to be required if value identifiers of delta index records are translated to a scheme of value identifiers of a main index. As the result set may still have values represented by value identifiers, rather than values, memory may be conserved (e.g., when merging thousands of results the memory space of each record may be significantly less which may add up to a large, overall memory savings). Although result sets may include many records, in some instances a result set may include no records or only a single record (e.g., as rows may be selected that match criteria of a query or all rows matching criteria may be invalid).

Although each of the figures describes a certain combination of features, implementations may vary. For example, additional, different, or fewer components may be included in the system 100 of FIG. 1.

For example, the process 500 of FIG. 5 may be a small part of an overall query flow that has many branches similar to the process 500, with many prior processing steps to bring a user request to a tractable form and many post-processing steps to generate a result for the user.

As another example, although the process 500 includes a certain number and type of sub-processes, in a certain order, implementations may vary. For example, an association between values identifiers of a main index and of a delta index (520, 532) may be generated only if such an association does not already exist. As another example, only one delta index may be deployed, in which case only that delta index may be checked for valid records. As another example, two delta indexes may use a same delta dictionary, which may conserve space and may result in a same scheme of value identifiers. As another example, instead of, or in addition to, returning a result set, a result set may be stored. For example, a result set may be stored for further searching within the result set. For example, search criteria may identify a selection of rows based on row identifiers to search for particular combination of attributes, and based on that criteria valid rows may be stored as a result set and that result set may be searched for the particular combination of attributes.

As another example, a result set may be assembled before translating value identifiers. For example, the sub-processes of 524 or 536 may occur before the respective sub-processes 520, 522 or 532, 534.

Although the description uses certain terms consistently, usage of such terms need not imply a fixed meaning. For example, although a first delta index is often discussed as being an index that generally accepts changes to a main index, a first index need not be as such and an index labeled as a second index may be that index. As another example, ordinal numbering, such as first, second, and third need not imply an ordering other than the order of the referents, and may simply be used to consistently refer to a same referent among a group of referents. For example, ordinal numbering may be used to differentiate between two components but might not imply, as examples, one is before another in chronology or importance.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product comprising a computer-readable storage medium tangibly storing instructions that, when executed by a data processing apparatus that comprises a programmable processor, cause the data processing apparatus to perform operations comprising:
receiving a second request to update a second record in a second index of changes to a first index of records of a database table, the second record comprising data representing a first change to a first record of a first index of a database table, the first record comprising a first row of the database table, the request to update comprising a second change to the first record;
inserting a third record representing the second change in the second index if a merge operation between the second index and the first index is not currently in progress or inserting the third record representing the second change in a third index of changes to the first index if the merge operation between the second index and the first index is currently in progress;
marking a second row of the second record in the second index as invalid without deleting the second row, a first row of the first record having been previously invalidated without having been deleted from the first index upon insertion of the second record into the second index in response to a first request to update the first record;
generating a result set matching a received search request, the result set comprising the first record, the second record, and the third record; and
returning the result set with the first record and the second record omitted from the result set while including the third record in the result set;
wherein at least one of the receiving, the inserting, the marking, the generating, and the returning are performed by the data processing apparatus.

2. The product of claim 1, wherein the first index, second index, and third index each have separate systems for assignment of value identifiers to values, the first index having value identifiers assigned alphabetically based on an alphabetical sorting of values, the second index having value identifiers assigned chronologically based on chronological insertion of records with values in the second index, and the third index having value identifiers assigned chronologically based on chronological insertion of records with values in the third index.

3. The product of claim 1, wherein the second record comprises a first value identifier, and the operations further comprise translating the first value identifier to a second value identifier based on a first association and a second association, the first and second associations being in a fourth record, the fourth record comprising the first association associating a value represented by the second record with the first value identifier, the second association associating the second value identifier with the data representing the change, the first value identifier identifying the data representing the change in the second index, and the second value identifier identifying the data representing the change in the first index of the database table.

4. The product of claim 1, wherein the operations further comprise appending a third attribute value provided by the update to a second end of a second chronologically ordered listing of updates made to the second index if the third record is inserted into the second index or to a third end of a third chronologically ordered listing of updates made to the third index if the third record is inserted into the third index.

5. The product of claim 3, wherein the operations further comprise processing the result set in accordance with the second value identifier and displaying the value associated with the second value identifier to a user.

6. The product of claim 1, wherein the first index includes data representing structured business data having data dependencies across a same row of a table.

7. The product of claim 6, wherein the business data comprises business objects modeled as sets of joined tables.

8. The product of claim 1, wherein the operations of the product are performed in parallel on a plurality of hardware servers.

9. The product of claim 1, wherein the operations further comprise asynchronously integrating the second record and other changes in the second index with the first index.

10. The product of claim 1, wherein the operations further comprise integrating the second record and other changes in the second index with the first index when the second index reaches a threshold memory footprint size.

11. The product of claim 1, wherein the first index includes value identifiers representing values in a dictionary of the value identifiers associated with the values.

12. The product of claim 3, wherein the second value identifier is used to represent values of records in the first index based on an alphabetical assignment of value identifiers in the first index and the first value identifier is used to represent values of records in the second index based on a chronological assignment of value identifiers in the second index.

13. The product of claim 1, wherein the first index is a flat file and the second index is a k-structured tree.

14. The product of claim 3, wherein the operations further comprise:
    receiving a first request to change first data of the first record in the first index to second data;
    storing in the second index the second record representing the second data with the first value identifier;
    generating the fourth record for the second record, the fourth record comprising the first association of the first value identifier with the second data, the first value identifier to identify the second data in the second index;
    generating the second association of the second value identifier with the second data, the second value identifier to identify the second data in the first index, and the second association to be included in the fourth record; and
    marking the first row of the first record in the first index as invalid.

15. The product of claim 1, wherein the generating further comprises
    finding N records, where N is an integer greater than one, the N records matching the search request and all denoting a same logical record, N minus one records of the N records being marked as invalid, and
    selecting an Nth record of the N records for inclusion in the result set while the N minus one records are not.

16. A method comprising:
    receiving a second request to update a second record in a second index of changes to a first index of records of a database table, the second record comprising data representing a first change to a first record of a first index of a database table, the first record comprising a first row of the database table, the request to update comprising a second change to the first record;
    inserting a third record representing the second change in the second index if a merge operation between the second index and the first index is not currently in progress or inserting the third record representing the second change in a third index of changes to the first index if the merge operation between the second index and the first index is currently in progress;
    marking a second row of the second record in the second index as invalid without deleting the second row, a first row of the first record having been previously invalidated without having been deleted from the first index upon insertion of the second record into the second index in response to a first request to update the first record;
    generating a result set matching a received search request, the result set comprising the first record, the second record, and the third record; and
    returning the result set with the first record and the second record omitted from the result set while including the third record in the result set;
    wherein at least one of the receiving, the inserting, the marking, the generating, and the returning are performed by a data processing apparatus comprising at least one programmable processor.

* * * * *